(12) United States Patent
Derrien

(10) Patent No.: US 9,517,537 B2
(45) Date of Patent: Dec. 13, 2016

(54) METHOD FOR RESHAPING A TURBOMACHINE BLADE THAT HAS AT LEAST ONE ZONE THAT HAS BECOME DEFORMED USING PEENING

(71) Applicant: SNECMA, Paris (FR)

(72) Inventor: Gerard Derrien, Moissy-Cramayel (FR)

(73) Assignee: SNECMA, Paris (FR)

( * ) Notice: Subject to any disclaimer, the term of this patent is extended or adjusted under 35 U.S.C. 154(b) by 84 days.

(21) Appl. No.: 14/358,440

(22) PCT Filed: Dec. 5, 2012

(86) PCT No.: PCT/FR2012/052811
§ 371 (c)(1),
(2) Date: May 15, 2014

(87) PCT Pub. No.: WO2013/083918
PCT Pub. Date: Jun. 13, 2013

(65) Prior Publication Data
US 2014/0325841 A1    Nov. 6, 2014

(30) Foreign Application Priority Data

Dec. 7, 2011  (FR) ...................... 11 61272

(51) Int. Cl.
*B23P 6/00* (2006.01)
*B24B 39/00* (2006.01)
(Continued)

(52) U.S. Cl.
CPC .............. *B23P 6/002* (2013.01); *B21D 31/06* (2013.01); *B23P 9/04* (2013.01); *B24B 1/04* (2013.01); *B24B 39/00* (2013.01); *B24C 1/04* (2013.01); *B24C 1/10* (2013.01); *B24C 5/005* (2013.01); *F01D 5/005* (2013.01); *F01D 5/34* (2013.01);
(Continued)

(58) Field of Classification Search
CPC .................... Y10T 29/49318; Y10T 29/49748; Y10T 29/49718; B23P 6/00; B23P 6/002; B21D 31/06
See application file for complete search history.

(56) References Cited

U.S. PATENT DOCUMENTS

| | | | | |
|---|---|---|---|---|
| 5,531,570 A | * | 7/1996 | Mannava | ................ B23P 9/00 219/121.65 |
| 5,735,044 A | * | 4/1998 | Ferrigno | ................ B23P 6/007 29/889.1 |

(Continued)

FOREIGN PATENT DOCUMENTS

| | | |
|---|---|---|
| DE | 10 2004 058 146 | 6/2006 |
| EP | 1 555 329 | 7/2005 |
| EP | 2 149 426 | 2/2010 |
| FR | 2 815 281 | 4/2002 |
| WO | 2009 105221 | 8/2009 |

OTHER PUBLICATIONS

International Search Report Issued Feb. 13, 2013 in PCT/FR12/052811Filed Dec. 5, 2012.

*Primary Examiner* — Jason L Vaughan
*Assistant Examiner* — Amanda Meneghini
(74) *Attorney, Agent, or Firm* — Oblon, McClelland, Maier & Neustadt, L.L.P.

(57) ABSTRACT

A method of reshaping a turbine engine blade including at least one deformed zone, the method including peening the deformed zone to be able to restore a shape of the at least one deformed zone.

13 Claims, 2 Drawing Sheets

(51) Int. Cl.
- *B24C 1/04* (2006.01)
- *B24C 1/10* (2006.01)
- *B24C 5/00* (2006.01)
- *B24B 1/04* (2006.01)
- *F01D 5/00* (2006.01)
- *F01D 5/34* (2006.01)
- *B23P 9/04* (2006.01)
- *B21D 31/06* (2006.01)
- *C21D 7/00* (2006.01)
- *C21D 7/06* (2006.01)

(52) U.S. Cl.
CPC ............ *B23P 2700/01* (2013.01); *C21D 7/00* (2013.01); *C21D 7/06* (2013.01); *F05D 2230/90* (2013.01); *Y02T 50/671* (2013.01); *Y02T 50/673* (2013.01); *Y10T 29/49336* (2015.01)

(56) References Cited

U.S. PATENT DOCUMENTS

| | | | |
|---|---|---|---|
| 6,701,615 B2* | 3/2004 | Harding | B23P 6/002 29/402.07 |
| 2006/0090336 A1 | 5/2006 | Graham et al. | |
| 2008/0223099 A1 | 9/2008 | David | |
| 2009/0094829 A1* | 4/2009 | Bunting | B23P 6/002 29/888.021 |
| 2009/0277541 A1 | 11/2009 | Bamberg et al. | |
| 2010/0024214 A1 | 2/2010 | Mielke | |
| 2010/0135780 A1 | 6/2010 | David | |
| 2011/0042364 A1* | 2/2011 | Bailey | B23K 26/0069 219/121.85 |
| 2011/0087352 A1 | 4/2011 | Krause | |

* cited by examiner

METHOD FOR RESHAPING A TURBOMACHINE BLADE THAT HAS AT LEAST ONE ZONE THAT HAS BECOME DEFORMED USING PEENING

The present invention relates to the field of repair of an integrally bladed rotor (IBR) of an aircraft turbojet engine and relates more generally to the repair of any turbine engine blade.

An aircraft turbojet engine conventionally includes a plurality of bladed rotor discs mounted axially in the turbojet engine. The upstream bladed disc, known to the person skilled in the art as a fan, has the function, on the one hand, of accelerating an air stream from upstream to downstream in the turbojet engine and, on the other hand, of providing the thrust of the aircraft.

While the aircraft is in flight, the turbojet engine may ingest foreign bodies (birds, dust, etc.) which damage and deform the fan blades. The performance levels and the service life of the fan blades are then reduced, which presents a drawback. In a known manner, in order to reshape a fan blade, this latter is placed in a die having a cavity of which the shape corresponds to that of a blade of optimal shape. Once it is in the die, the damaged/deformed blade is compressed at a temperature of the order of 700° C. in such a way that this latter follows the shape of the cavity of the die and thus resumes an optimal shape.

Conventionally, the fan includes radial blades of large dimensions in order to increase the dilution ratio of the turbojet engine. In order to limit the mass of the fan and to improve the dynamic behaviour thereof, the fan of a turbojet engine is generally formed in one integral part known by the abbreviation IBR, for 'integrally bladed rotor'. When the blades of an IBR are damaged, they cannot be repaired by a conventional method by compression in a die given that the blades cannot be separated individually from the IBR.

In order to eliminate this drawback, the French patent applications FR 2 882 533 A1 and FR 2 902 360 A1 by SNECMA disclose a method for repairing an IBR by addition of material wherein a material sample is soldered to the IBR by means of an electron beam. Such a method is appropriate when a part of the blade has been torn off or damaged but is difficult to implement when the blades of the IBR are deformed. Thus, in practice an IBR of which the blades are deformed is never repaired.

In order to eliminate at least some of these drawbacks, the invention relates to a method of reshaping a turbine engine blade comprising at least one deformed zone, said method comprising a step of peening of the deformed zone so as to be able to restore the shape of said zone.

Although the present invention originates from a problem relating to the repair of blades of an integrally bladed rotor (IBR) of a turbojet engine, the invention relates more generally to the repair of any turbine engine blade.

A method of peening is already known from the prior art, for example from the patent applications FR 2 815 280 A1, FR 2 815 281 A1 and FR 2 873 609 A1, in order to improve the resistance of mechanical parts, in particular turbine engine blades. A method of peening consists of blasting beads of small dimensions or microbeads onto the surface to be treated in order to produce a local buildup of compressive stresses.

One of the drawbacks of peening is that it can cause an elongation of the metal and a deformation of the blades which impairs the performance thereof. To this end, it is known for the blade to be treated to be held firmly during the peening in order to limit any deformation.

In order to restore the shape of a blade, the applicant has deviated from the conventional use of a peening device in such a way as to take advantage of effects traditionally considered to be detrimental. The peening according to the invention makes it possible advantageously to restore the shape of a blade while cold. Contrary to the prior art, it is not necessary to raise the blade to high temperatures, which limits the risk of thermal damage and makes it possible to increase the service life of the blade.

Preferably, the method of reshaping includes a step of ultrasonic peening. Advantageously, an ultrasonic peening device can be easily positioned and oriented, which makes it possible for a plurality of adjacent deformed zones of a blade to be reshaped quickly. This is particularly advantageous in order to reshape an integrally bladed rotor (IBR), wherein the ultrasonic peening device can be placed between two consecutive blades of the IBR.

Thus, the shape of the blades of an IBR can be restored quickly by modifying the position and the orientation of the ultrasonic peening device.

Preferably, as the blade comprises a first face and a second face opposite the first face, and as the deformed zone is situated on the first face, the second face is free to deform during peening of the first face. As the second face is not retained during the peening of the deformed zone, the buckling of the deformed zone is favoured during the peening which enables quick restoration of the shape of the deformed zone.

Preferably, as the blade comprises a first face and a second face opposite the first face, and as the deformed zone is situated on the first face, the second face is not peened during peening of the first face. Thus, stresses are only applied by the first face, which favours the buckling of the deformed zone.

More preferably, the deformed zone is peened in a direction substantially normal to the deformed zone in such a way as to restore the zone quickly and reproducibly.

According to one aspect of the invention, the method for reshaping includes:
  acquisition of a profile of said blade,
  comparison of said profile with a reference profile in such a way as to deduce therefrom at least one deformed zone of the blade;
  peening of the deformed zone of the blade by means of a peening device for a given parameterisation of said device in such a way as to restore the shape of the deformed zone; and
  recording in a deformation database of an association of the deformed zone with the parameterisation of the peening device.

Advantageously, a knowledge base is formed empirically following peening by associating a given deformed zone with a parameterisation of the peening device. Preferably at least the position of the deformed zone is recorded. More preferably, the deformation database includes at least one degree of deformation of the deformed zone. More preferably, at least the duration of peening is recorded as parameterisation of the peening device.

According to one aspect of the invention, the method for reshaping includes:
  acquisition of a profile of said blade,
  comparison of said profile with a reference profile in such a way as to deduce therefrom at least one deformed zone of the blade;

comparison of the deformed zone with a deformation database including a plurality of deformed zones associated respectively with a plurality of parameterisations of a peening device;

determination of the parameterisation associated with said deformed zone; and peening of the deformed zone of the blade by means of the peening device as a function of said determined parameterisation.

Thus a blade is reshaped in a reproducible and optimal manner using one and the same parameterisation of the peening device when a deformed zone of which the characteristics are known is newly detected.

Preferably, if no parameterisation is associated with the deformed zone in the deformation database, peening of the deformed zone of the blade is performed by means of a peening device for a given parameterisation of said device in such a way as to restore the shape of the deformed zone; and the association of the deformed zone with the parameterisation of the peening device is recorded in the deformation database. Thus, when this is the first time that a deformed zone, of which the characteristics are not catalogued in the knowledge base, is detected, the deformed zone is peened manually in order to restore the shape of the deformed zone. Next the knowledge base is augmented by associating the deformed zone with the parameterisation of the peening device which has been used to reshape it.

According to a preferred aspect of the invention, the turbine engine blade is a blade of an integrally bladed rotor. A method of reshaping according to the invention enables restoration of the shape of the IBR even if the space between two consecutive blades is very limited.

The invention will be better understood when reading the following description given solely by way of example and with reference to the appended drawings, in which.

It should be noted that the drawings disclose the invention in a detailed manner in order to carry out the invention, and said drawings can of course serve to give a better definition of the invention where appropriate.

The invention will be presented for the reshaping of a turbine engine blade belonging to an integrally bladed rotor (IBR) of a turbojet engine, but of course the following description applies to any turbine engine blade.

Figure 1:
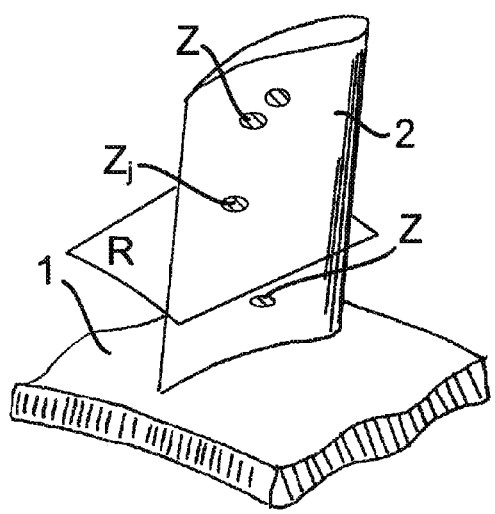
FIG. 1 shows a perspective view of a turbine engine blade comprising a plurality of deformed zones.

FIG. 1 shows part of an IBR of an axial turbojet engine having an annular rim 1 which extends axially and a blade 2 which extends radially. For the sake of clarity, only blade 2 of the IBR is shown in FIG. 1. In the course of operation of the aircraft, the blades 2 of the IBR become deformed, which affects their aerodynamic performance. In order to detect the deformations of a blade to be reshaped 2, several manual or automated methods may be implemented.

As shown in FIG. 1, the blade to be reshaped 2 includes a plurality of deformed zones Z which impair the aerodynamic performance of the blade 2. The restoration of the shape of the deformed zone referenced Zj in FIG. 1 and situated in the transverse plane R will now be described.

Deformed Zones Z

Preferably, each deformed zone Z of the blade to be reshaped 2 has a substantially equal surface area. Thus, a large deformed surface of the blade 2 may be divided into a plurality of individual surfaces each corresponding to a deformed zone Z according to the invention. By way of example, the surface area of a deformed zone Z is of the order of 3,000 mm².

Figure 2:
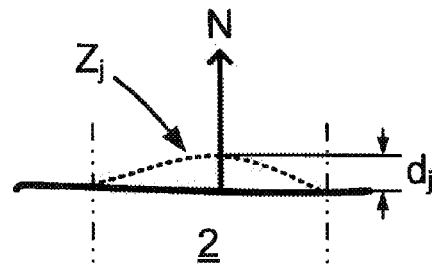
FIG. 2 shows a schematic sectional view of a blade with a deformed zone before peening thereof.
Figure 3:
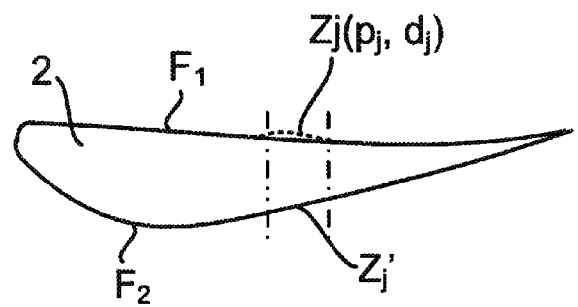
FIG. 3 shows a close-up schematic sectional view of a deformed zone of the blade.

Each deformed zone Z is defined here by several parameters: its position p on the blade 2 and its degree of deformation d. Thus, as an example, with reference to FIG. 3, the deformed zone referenced Zj in FIG. 1 is defined by three-dimensional co-ordinates $p_j$ indicating its position with respect to a reference point of the IBR or of the blade to be reshaped 2. The degree of deformation $d_j$ of the deformed zone Zj corresponds, for example, to the difference between the profile of the blade to be reshaped and the reference blade profile in the position $p_j$ of the deformed zone Zj. With reference to FIG. 3, the deformed zone Zj is formed, in this example, on the pressure side F1 of the blade 2. Preferably, with reference to FIG. 2, the degree of deformation $d_j$ is defined with respect to the normal direction N of the deformed zone Zj. By way of example, the degree of deformation d is of the order of 0.05 mm to 0.25 mm.

Peening of the Deformed Zones

According to the invention, the deformed zones Z of the blade to be reshaped 2 are peened in such a way as to restore the shape of the blade 2 by localised buckling of the deformed zones Z.

The patent applications FR 2 815 280 A1 and FR 2 815 281 A1 disclose a peening device suitable for implementing the invention in order to restore the shape of a blade 2.

Figure 4:
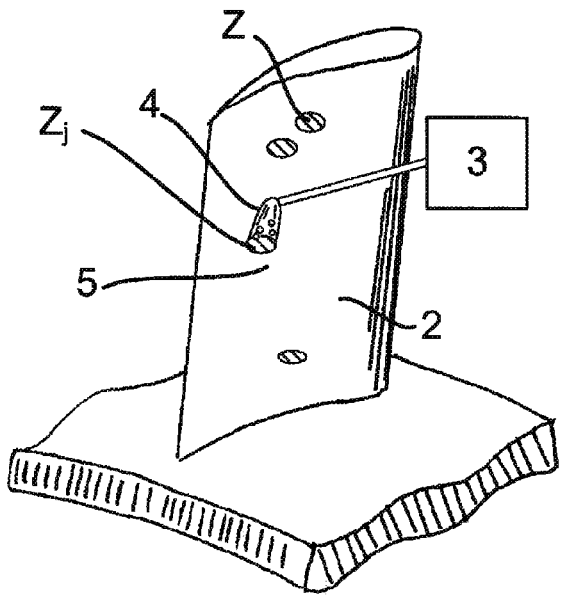
FIG. 4 shows a perspective view of the peening of a deformed zone of the blade.
Figure 5:
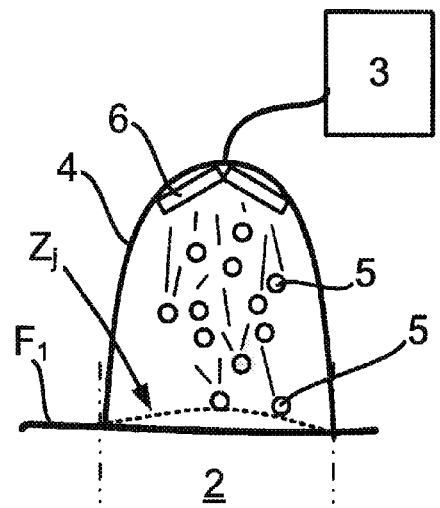
FIG. 5 shows a close-up schematic sectional view of a deformed zone of the blade during peening thereof.

A peening device 3, shown schematically in FIGS. 4 and 5, includes a bell housing 4 having an opening suitable for bearing on a face of the blade to be reshaped 2 in such a way that the surface of the blade 2 closes the opening of the bell housing 4 and thus forms a closed compartment as shown in FIG. 5. The peening device 3 includes vibrating surfaces 6 disposed inside the bell housing 4 which are capable of transmitting kinetic energy to projectiles 5 placed in the bell housing 4 in such a way that these latter are projected against the surface of the blade 2 closing the bell housing 4 as shown in FIG. 5.

In this example, the projectiles 5 are beads or microbeads which are projected by sonotrodes 6 in such a way as to produce ultrasonic peening. Of course the sonotrode may be replaced by other elements capable of producing vibrations which make it possible to project projectiles such as beads or microbeads in a comparable way onto a part to be treated.

An ultrasonic peening device 3 has a bell housing 4 of which the dimensions are reduced, which enables easy handling. Thus the bell housing 4 may be simply moved from one zone of the deformed blade Z to another deformed zone Z quickly and precisely. Furthermore, such a bell housing 4 can be simply moved between two consecutive blades of an IBR, which is advantageous.

Although the invention is described for ultrasonic peening, of course the invention applies to any type of peening.

According to the invention, the bell housing 4 has an opening of which the surface area is substantially equal to the surface area of a deformed zone Z. Thus, when the bell housing 4 is positioned in the direction N normal to the deformed zone Z, the surface of the deformed zone Z can be entirely peened so as to allow localised buckling of the blade 2 in the region of the deformed zone Z.

The peening device 3 is advantageously parameterisable in such a way that the deformation resulting from the peening is calibrated as a function of the chosen parameterisation. Parameterisation is understood principally to be the duration of the peening but of course other parameters of the peening device 3 can be taken into account such as the quantity of kinetic energy transmitted to the projectiles, the dimensions of the projectiles, the dimensions of the bell housing, etc.

In order to restore the shape of the blade 2, with reference to FIG. 5, the bell housing 4 of the peening device 3 is put in contact on the pressure side F1 of the blade 2 in such a way that the deformed zone Zj is surrounded by the edge of the opening of bell housing 4. The projectiles 5 of the peening device 3 accommodated in the bell housing 4 are accelerated by the sonotrodes 6 mounted in the bell housing 4 in order to impact on the zone Zj which is deformed as a function of the parameterisation of the peening device 3.

In this example, with reference to FIG. 3, in order to promote the phenomenon of localised buckling, the zone Zj' situated on the face F2 of the blade 2 opposite the deformed zone Zj, that is to say the intake side F2, is not held during the peening in such a way as to facilitate the deformation of the deformed zone Zj. This goes against the teaching of the peening methods according to the prior art which recommend constraining the opposing zone Zj' in order to facilitate the surface treatment of the peened zone and avoiding any deformation. The opposing zone Zj' may be peened in the course of the reshaping method if it exhibits a deformation. Preferably, a deformed zone Zj and its opposing zone Zj' are not peened simultaneously so as to promote the buckling of the blade to be reshaped 2.

When the projectiles 5 come into contact with the deformed zone Z, the blade is deformed locally by buckling. Any deformation projecting with respect to the reference blade profile is then smoothed in such a way as to find an optimal profile. After peening, the shape of the deformed zone Z is restored, which improves the aerodynamic performance of the blade 2.

Method of Reshaping

In order to enable precise, quick and reproducible reshaping of the blades 2, the method is preferably carried out by means of a robotic automatic machine (not shown) on which all or part of the peening device 3 is mounted. Consequently, the invention will be described for an automatic machine including at least the bell housing 4 of the peening device 3 mounted at one end of a robotic arm of the automatic machine. Preferably, the arm of the automatic machine is capable of moving in all the positions and in all the orientations.

Figure 6:
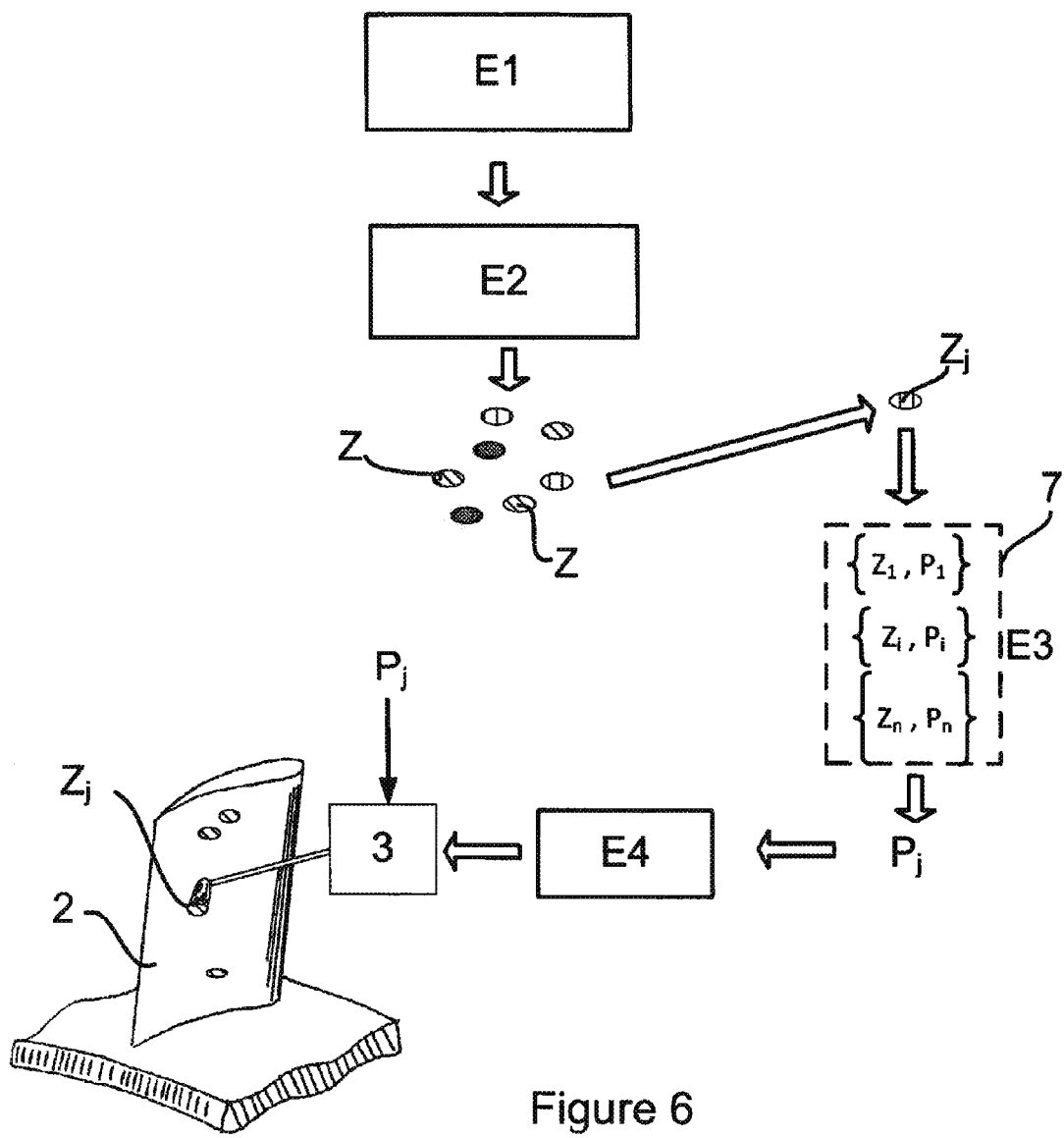
FIG. 6 shows a schematic diagram representing the steps of a method of reshaping according to the invention.

Preferably, with reference to FIG. 6, the method of reshaping according to the invention includes a step of acquisition E1 of the profile of the blade to be reshaped 2. This acquisition E1 is carried out preferably by means of an acquisition device without contact, known to the person skilled in the art, which makes it possible to obtain the three-dimensional co-ordinates of a plurality of points on the surface of the blade to be reshaped 2 in order to form a cluster of points defining the profile of the blade to be reshaped 2. Preferably, the acquisition is carried out by photogrammetry, which has the advantage of fast access to a precise file composed of clusters of points corresponding to the profile of the blade.

Next, the step of acquisition E1 is followed by a step of comparison E2 during which the profile acquired is compared with a reference profile of the blade 2. This reference profile conventionally takes the form of a mathematical model defined in 3D, preferably, in the form of a mesh.

During the comparison E2, the disparities of shape are demonstrated and located in space. Preferably, the disparities of shape are divided into individual zones of which the surface is predetermined and which correspond to the deformation zones Z as described previously.

More preferably, each deformation zone Zj is characterised by its position in space pj as well as its degree of deformation dj as described previously.

Then each deformation zone Zj is sought in a deformation database 7 including a plurality of deformed zones Zi associated respectively with a plurality of parameterisations Pi of the ultrasonic peening device 3. As will be detailed below, the database 7 is formed empirically following the manual peening of a plurality of deformation zones Z, of which the spatial positions and the degrees of deformation are different, which have enabled restoration of the shape of said deformed zones Z. In fact, in order to restore the shape of the blade 2 in an optimal manner, each deformed zone Zj is peened by the peening device 3 of which the parameterisation Pj is defined and "customised" as a function of specific characteristics of the deformed zone Zj.

In the course of the step E3 of searching in the deformation database 7, each deformed zone Zj of the blade to be reshaped 2 is associated with a parameterisation Pj of the peening device 3.

Next, in the course of a step of peening E4, the bell housing 4 of the peening device 3 is placed on the deformed zone Zj and the peening device 3 is parameterised with the parameterisation Pj associated with the given deformed zone Zj in order to restore the blade 2 in an optimal manner. Advantageously, when the peening device 3 is mounted on a robotic automatic machine, the displacement and the parameterisation of the peening device 3 can be accelerated significantly, which makes it possible to restore the shape of a blade 2 entirely in a reduced time. This is particularly advantageous in order to reshape an IBR comprising a plurality of blades 2 each having a plurality of deformed zones Z.

In order to create the deformation database 7, a given deformed zone Zj with a given degree of deformation dj is selected then said given zone Zj is peened in such a way as to deform it whilst measuring the duration of the peening. When the shape of the zone Zj is restored, the peening is stopped and the duration of the peening which enabled restoration of the deformed zone Zj is deduced therefrom.

Next, in the deformation database 7 the deformed zone Zj (of given position pj and of given degree of deformation dj) is associated with the parameterisation Pj of the peening device 3, in this example the measured duration of peening tj. Thus, if one and the same deformed zone Zj is detected subsequently (same position pj and same degree of deformation dj), the optimal duration of peening tj in order to reshape said zone Zj is known.

Determination of the optimal duration of peening has been described previously, but of course other values can be measured in order to determine the optimal parameterisation of the peening device 3 for a given deformed zone, for example the dimension of the projectiles, the speed of the projectiles, the frequency of impacts, the number of beads, etc.

Preferably, in the course of the search for the appropriate parameterisation of the peening device 3 in the database 7 for a given deformed zone Zj, the parameterisation may be deduced by interpolation of parameterisations present in the database 7. This makes it possible to restore the blade 2 quickly when the size of the database 7 is not large.

Preferably, after peening, the zone Zj of the blade 2 is heat treated in such a way as to eliminate all the compressive stresses added during the restoration of the shape of the blade by ultrasonic peening. Such compressive stresses are not wanted during the operation of the engine.

The invention claimed is:

1. A method to reshape a turbine engine blade which includes at least one deformed zone, the method comprising:
    acquiring a profile of the blade;
    comparing the profile with a reference profile so as to deduce therefrom at least one deformed zone of the blade;
    dividing the deformed zone into a plurality of non-overlappingly divided deformed zones;
    comparing the divided deformed zone with a deformation database including a plurality of divided deformed zones associated respectively with a plurality of parameterizations of a peening device;
    determining the parameterization associated with the divided deformed zones;
    peening by ultrasonic peening each of the divided deformed zones of the blade individually so as to not significantly raise a temperature of the blade using the peening device as a function of the determined parameterization so as to restore a shape of the deformed zone,
    wherein the blade includes two faces opposite one another, and when one of the divided deformed zones is situated on one of the two faces, a surface situated on the other of the two faces opposite the one of the divided deformed zones is free to deform during the peening of the one of the divided deformed zones.

2. The method according to claim 1, wherein the blade includes a first face and a second face opposite the first face and the deformed zone is situated on the first face, and the second face is not peened during the peening of the first face.

3. The method according to claim 1, wherein the deformed zone is peened in a direction substantially normal to the deformed zone.

4. The method according to claim 1, further comprising:
    recording in a deformation database an association of the deformed zone with the parameterization of the peening device.

5. The method according to claim 1, wherein the deformation database includes at least one degree of deformation of the deformed zone.

6. The method according to claim 1, wherein when no parameterization is associated with the deformed zone in the deformation database, the peening of the deformed zone of the blade is performed by the peening device for a given parameterization of the peening device to restore the shape of the deformed zone; and an association of the deformed zone with the parameterization of the peening device is recorded in the deformation database.

7. The method according to claim 1, wherein the turbine engine blade is a blade of an integrally bladed rotor.

8. The method according to claim 1, wherein the second face is not retained during the peening of the first face.

9. The method according to claim 1, wherein the ultrasonic peening is performed by beads which are projected inside a housing.

10. The method according to claim 1, further comprising placing a housing with an opening against the blade to form a closed compartment enclosed by the housing and the at least one deformed zone, and peening inside the compartment.

11. The method according to claim 10, wherein the blade includes a plurality of deformed zones, the method further comprising placing the housing against another of the deformed zones without disassembly of the blade.

12. The method according to claim 1, further including updating the deformation database based on the peening of the deformed zone, the updating adding to the deformation database a duration of peening associated with a given degree of deformation based the peening of the deformed zone.

13. The method according to claim 1, wherein the plurality of parameterizations include one of a duration of the peening, a quantity of kinetic energy transmitted to projectiles used in the peening, dimensions of projectiles used in the peening, dimensions of a bell housing used in the peening, speed of projectiles used in the peening, a frequency of impacts, and a number of beads.

* * * * *